Figure 1:
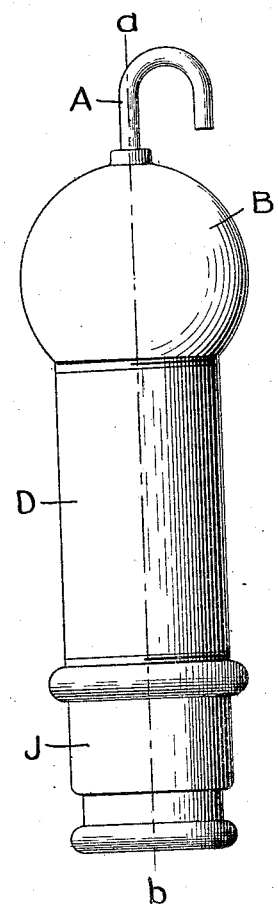

E. F. DONNELLY.
SAFETY DEVICE TO PREVENT THE COLLAPSING OF HOT WATER BOILERS.
APPLICATION FILED MAY 24, 1915.

1,212,148.

Patented Jan. 9, 1917.

Inventor.
Edward F. Donnelly
by Heard Smith & Tennant.
Attys.

UNITED STATES PATENT OFFICE.

EDWARD F. DONNELLY, OF MALDEN, MASSACHUSETTS, ASSIGNOR TO DONNELLY MANUFACTURING COMPANY, OF MALDEN, MASSACHUSETTS, A CORPORATION OF MASSACHUSETTS.

SAFETY DEVICE TO PREVENT THE COLLAPSING OF HOT-WATER BOILERS.

1,212,148.

Specification of Letters Patent.

Patented Jan. 9, 1917.

Application filed May 24, 1915. Serial No. 30,255.

*To all whom it may concern:*

Be it known that I, EDWARD F. DONNELLY, a citizen of the United States, residing at Malden, county of Middlesex, State of Massachusetts, have invented an Improvement in Safety Devices to Prevent the Collapsing of Hot-Water Boilers, of which the following description, in connection with the accompanying drawing, is a specification, like characters on the drawing representing like parts.

This invention has for its object to provide a novel device for preventing a hot water boiler from collapsing in case a vacuum tends to form therein for any reason, which device is simple in construction, inexpensive to manufacture and easily installed.

In order to give an understanding of my invention I have illustrated in the drawings a selected embodiment thereof which will now be described, after which the novel features will be pointed out in the appended claims.

Figure 2:
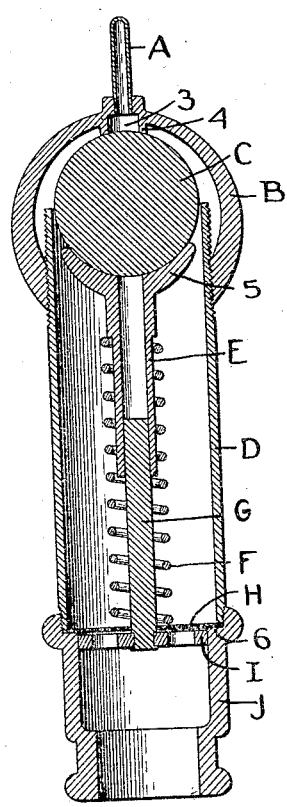

Figure 1 of the drawings is a side elevation of a device embodying my invention; Fig. 2 is a vertical section on the line a—b, Fig. 1.

My improved device comprises a casing adapted to be secured to the hot water boiler and provided with an air inlet port and a spring-pressed ball valve of cork composition within the casing which normally closes said port and prevents the escape of water therefrom, but which opens automatically when a vacuum tends to be formed, thereby admitting air and preventing the collapse of the boiler. The casing is shown at D and is in the form of a tube which is screw-threaded at its lower end into a coupling member J that is adapted to be secured to a pipe connected to the hot water boiler. The upper end of the casing is closed by a spherical-shaped head or valve chamber B which is screw-threaded to the upper end of the tube D. This member B is provided with an air inlet port 3 with which communicates an air inlet pipe A, the latter being bent into a substantial U-shape so as to prevent the dust or dirt from clogging up the inlet port. The member B is formed with an annular valve seat 4 which surrounds the inlet port 3 and on which a ball valve C is adapted to seat. This ball valve is made of cork composition which is treated in some suitable way so that it will not absorb water and so that it will neither swell nor shrink. It is, however, more or less elastic so that it will seat firmly against the valve seat 4 and make a tight joint.

The ball valve C rests loosely on a spring-pressed follower constructed to present the hollow stem E and the cup-shaped upper end 5 having a contour to fit the ball valve C. This stem E telescopes over a stud or pin G which is fixedly secured to a plate I that in turn is secured to the coupling J.

F is a spiral spring which encircles the stud G and the lower end of the hollow stem E and which operates to hold the valve C yieldingly against the valve seat.

H is a screen plate resting on the perforated plate I and also on the shoulder 6 formed in the coupling member J. The spring F rests against the screen plate and holds it in place. The purpose of said plate is to prevent any sediment or foreign matter from entering the casing D which would be likely to prevent the valve from seating.

The pipe which is secured to the coupling J leads to the hot water boiler and, therefore, the water from the boiler will fill the casing D. The spring F, however, normally keeps the valve seated against the valve seat 4 and thus prevents the escape of water. If, however, a vacuum should tend to develop within the hot water boiler the valve C will be withdrawn from its seat against the action of the spring F, thus allowing air to enter and preventing the collapse of the boiler.

The device is very simple in construction and easily applied to any boiler.

The cork valve C has the advantage that it is elastic and it will, therefore, seat firmly against the valve seat 4. By properly treating this cork valve it can be made so that it will neither swell nor shrink. By having the cork valve rest loosely against the cup-shaped portion 5 the valve is free to turn whenever it is unseated so that a fresh portion thereof will engage the valve seat when it is seated again.

I claim:

1. In a safety device for hot water boilers, the combination with a cylindrical casing adapted to be connected at one end to a hot water boiler, of a head secured to the other end of the casing and provided with an air inlet port and an inwardly-projecting annular valve seat, a ball valve of cork composition adapted to engage said seat, a follower having a cup-shaped end against which said valve loosely rests and on which it is free to turn when the valve is open whereby different portions of the valve may be presented to the valve seat, a spring acting against the follower to hold the valve yieldingly against its seat, and means other than the casing and situated therewithin to guide the follower in its movement as the valve opens and closes.

2. In a device of the class described, the combination with a cylindrical casing adapted to be connected to a hot water boiler, of a head secured to said casing and provided with an air inlet port and an annular valve seat, a ball valve of cork composition adapted to engage said seat, a follower having a cup-shaped end against which said valve loosely rests and a hollow stem, a guiding pin secured to said casing and over which said stem telescopes, and a spring encircling said pin and stem and holding the valve yieldingly against its seat.

EDWARD F. DONNELLY.

Witnesses:
FREDERICK S. BOYD,
WILLIAM M. SMITH,
WALTER C. WARDWELL.

Copies of this patent may be obtained for five cents each, by addressing the "Commissioner of Patents, Washington, D. C."